W. P. KIDDER.
SHOCK ABSORBING MECHANISM FOR VEHICLE SPRINGS.
APPLICATION FILED JAN. 11, 1907.

911,402.

Patented Feb. 2, 1909.

WITNESSES:
A. L. Hood
Frank G. Parker

INVENTOR:
Wellington P. Kidder,
By his Att'y

UNITED STATES PATENT OFFICE.

WELLINGTON P. KIDDER, OF BOSTON, MASSACHUSETTS.

SHOCK-ABSORBING MECHANISM FOR VEHICLE-SPRINGS.

No. 911,402.

Specification of Letters Patent.

Patented Feb. 2, 1909.

Application filed January 11, 1907. Serial No. 351,744.

*To all whom it may concern:*

Be it known that I, WELLINGTON P. KIDDER, a citizen of the United States, residing in Boston, in the county of Suffolk and State of Massachusetts, have invented a new and useful Improvement in Shock-Absorbing Mechanism for Vehicle-Springs, of which the following is a specification.

My invention has for its object to provide a shock-absorbing mechanism particularly applicable to vehicle-springs, in which the depression and rebound of the vehicle-body are progressively checked by an increasing resistance as the spring is expanded and contracted; in which such movements of the vehicle-body are positively limited at the end of the checking process without shock; in which these results are produced with a minimum amount of interference with the freedom of normal spring action; and in which the employment of lighter or softer springs is possible with absolute protection from danger of breakage, such mechanism being adapted to be applied in connection and combination with springs of ordinary construction.

The nature of the invention is fully described below, and illustrated in the accompanying drawings, in which:—

Figure 1:
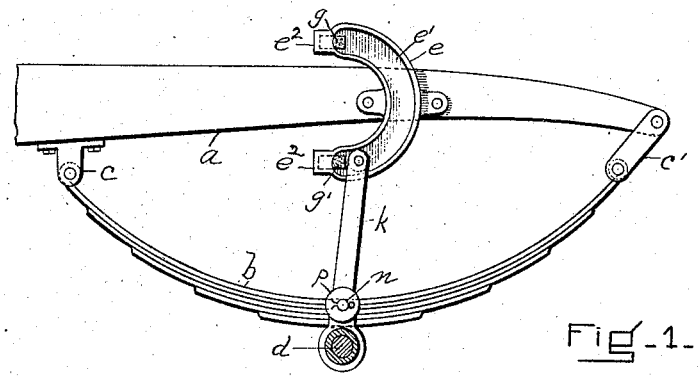
Figure 2:
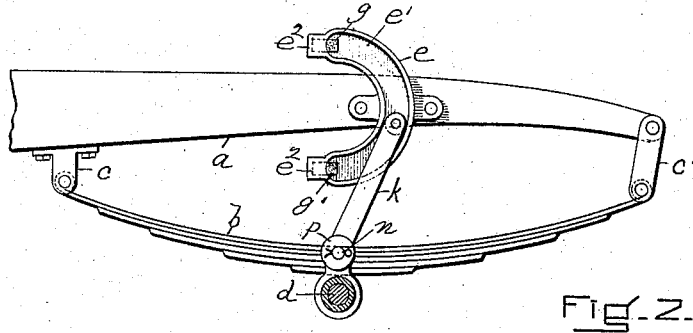
Figure 3:
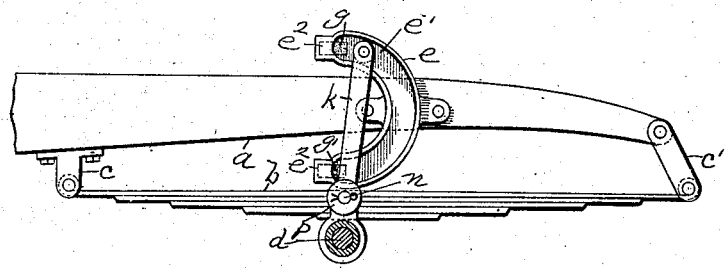
Figure 4:
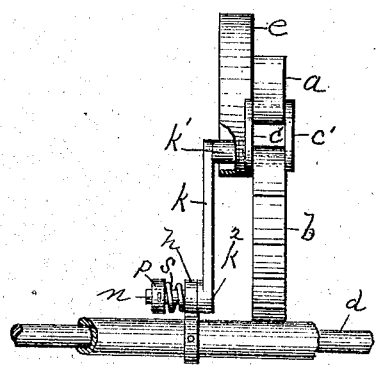

Figure 1 is a sectional side elevation showing my invention applied to the frame of a carriage-body, an axle and spring, with the spring in its extreme contracted position, and the frame supporting the carriage-body at its highest possible point. Fig. 2 is a similar view with the parts in their normal position. Fig. 3 is a similar view with the spring in its extreme expanded position, and the carriage-body at its lowest possible point. Fig. 4 is an end elevation looking toward the left, a portion being broken out.

Similar letters of reference indicate corresponding parts.

*a* represents a portion of the frame for supporting the body of a vehicle, and *b* is an ordinary carriage-spring, the one illustrated being of the semi-elliptical type, connected with the body-frame by ordinary mechanism *c c'*.

*d* is the axle.

Rigidly secured to the body-frame or to any part which is rigid with the body of the vehicle, is a vertically set cam *e* provided with a curved or arc-shaped groove *e'*, said groove having closed ends *e²* in which are set stops *g g'* of leather or other suitable material. Pivotally secured on the axle, (which is usually under the central portion of the spring) by means of a lug *h* is the lower end of a lever *k* whose upper end is provided with a cam-roll *k'* which extends into the cam-groove *e'*. The pivot-pin *n* which extends from the lower end of the lever *k* through the lug *h* is provided at its outer end with a collar *p*, and between said collar and the stud with a spiral spring *s*. By this means a frictional drag-bearing is produced, the friction being applied between the flat contact surfaces of the lug *h* and the lower end *k²* of the lever *k*. This curved cam may be termed a double-acting wiper-cam, and when the spring is in its normal position the cam-roll is about one-half the distance up the cam. When a load is applied to the carriage-body the cam-roll moves from the central position in the cam up toward the upper end, the resistance to its movement gradually increasing as it approaches the upper stop *g*, such resistance being multiplied by the frictional drag-bearing at the lower end of the lever. When the spring rebounds there is the same progressive frictional resistance as it moves from the position indicated in Fig. 2 to that indicated in Fig. 1. In each case there is a positive but gradual arrest of spring action and the movement of the cam-roll is limited by the two stops *g* and *g'* which are in a vertical line so located as to prevent the lever from reaching a dead point.

Having thus fully described my invention, what I claim, and desire to secure by Letters Patent, is:—

1. In a shock-absorbing mechanism for vehicle-springs, a vehicle-body portion, a supporting axle, a spring intermediate of the axle and the body, a cam rigid with the body-portion and provided with a curved cam-groove, a lever pivotally connected with the axle and with its upper end in engagement with the cam-groove, and a frictional drag-mechanism bearing against said lever, for the purpose set forth.

2. In a shock-absorbing mechanism for vehicle-springs, a vehicle-body portion, a supporting axle, a spring intermediate of the axle and the body, a cam rigid with the body-portion and provided with a curved cam-groove having stops at its ends, a lever pivotally connected with the axle and with its upper end in engagement with the cam-groove, and a frictional drag-mechanism bearing against said lever, for the purpose set forth.

3. In a shock-absorbing mechanism for vehicle-springs, a vehicle-body portion, a supporting axle, a spring intermediate of the axle and the body, a double-acting wiper-cam rigid with the body-portion, a lever pivotally connected at its lower end directly with the axle and with its upper end in engagement with the cam, and a frictional drag-mechanism bearing against said lever, for the purpose set forth.

4. In a shock-absorbing mechanism for vehicle-springs, a vehicle body-portion, a supporting axle, a spring intermediate of the axle and the body, a cam rigid with the body-portion and provided with a curved cam-groove, a lever pivotally connected with the axle and with its upper end in engagement with the cam-groove, stops supported by the body and adapted to prevent the lever from reaching a dead point, and a frictional drag-mechanism bearing against said lever, for the purpose set forth.

In testimony whereof I have signed my name to this specification in the presence of two subscribing witnesses.

WELLINGTON P. KIDDER.

Witnesses:
 HENRY W. WILLIAMS,
 A. K. HOOD.